United States Patent [19]

Selling et al.

[11] Patent Number: 4,652,085

[45] Date of Patent: Mar. 24, 1987

[54] DARK ROOM SAFE LIGHT FILTER ASSEMBLY FOR A TV SET

[76] Inventors: Harley M. Selling; Bernard M. Levin, both of P.O. Box 2533, Farmington Hills, Mich. 48018

[21] Appl. No.: 848,637

[22] Filed: Apr. 7, 1986

[51] Int. Cl.⁴ .......................... G02B 5/22; G02B 7/00; H04N 5/65; F21V 9/00

[52] U.S. Cl. ..................... 350/318; 350/311; 358/247; 358/253; 358/255; 362/803; 362/257; 362/267

[58] Field of Search ........... 350/318, 311, 144, 276 R, 350/319, 589, 452, 245, 243; 358/247, 252–255; 362/803, 257, 267

[56] References Cited

U.S. PATENT DOCUMENTS

| | | | |
|---|---|---|---|
| 3,418,426 | 12/1968 | Schlegel et al. | 350/318 |
| 3,627,926 | 12/1971 | Nichols | 358/253 |
| 3,646,266 | 2/1972 | Hassell | 358/253 |
| 3,785,720 | 1/1974 | Kyryluk | 350/144 |
| 4,204,231 | 5/1980 | Permenter | 358/247 |
| 4,247,871 | 1/1981 | Hirsch et al. | 350/318 |

FOREIGN PATENT DOCUMENTS

| | | | |
|---|---|---|---|
| 783593 | 9/1957 | United Kingdom | 358/255 |
| 2067380 | 7/1981 | United Kingdom | 358/252 |

Primary Examiner—Jon W. Henry
Attorney, Agent, or Firm—Cullen, Sloman, Cantor, Grauer, Scott, & Rutherford

[57] ABSTRACT

A darkroom safelight filter assembly for a TV set comprises a filter screen tinted to exclude damaging light rays for photographic materials, having a bracket thereon mounting a block of sponge rubber supported on the top wall of the TV set. The filter screen depends from the bracket, is spaced from the TV screen and includes a continuous strip of resilient light sealing sponge rubber of rectangular shape for snug sealing registry with the TV casing surrounding the TV screen.

10 Claims, 8 Drawing Figures

U.S. Patent  Mar. 24, 1987  4,652,085
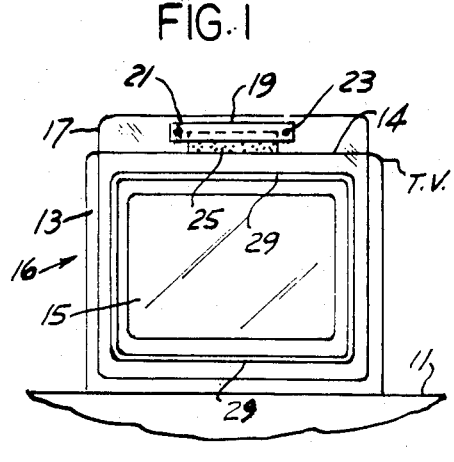
FIG. 1
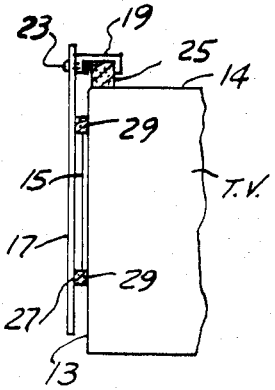
FIG. 2
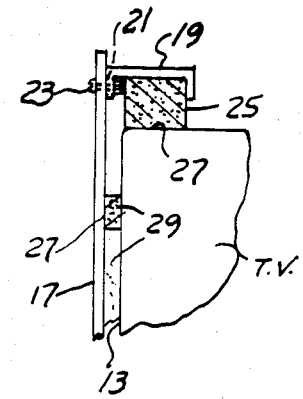
FIG. 3
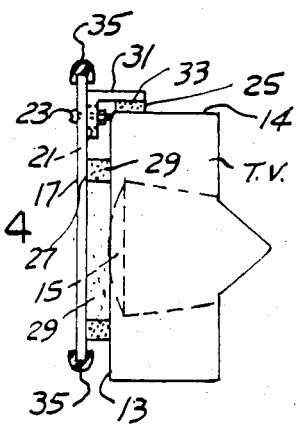
FIG. 4
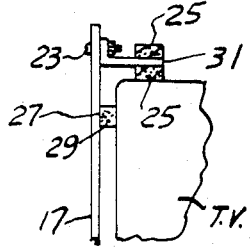
FIG. 6
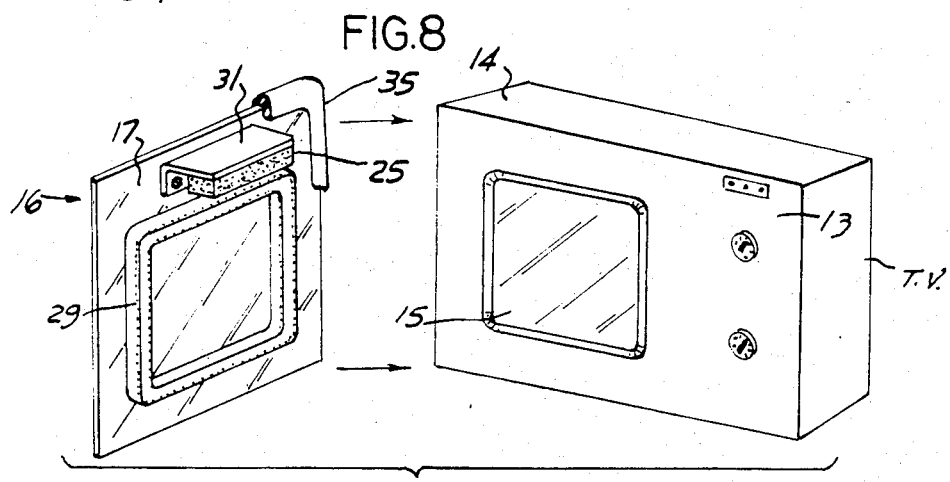
FIG. 5 / FIG. 7 / FIG. 8

DARK ROOM SAFE LIGHT FILTER ASSEMBLY FOR A TV SET

The present invention is directed to darkroom safelights and more particularly to a safelight filter assembly attachable to the front face of a TV set overlying the screen protectively excluding damaging light waves from photographic materials in the darkroom and particularly photographic paper.

BACKGROUND OF THE INVENTION

Heretofore, it is well known that in the use of darkrooms, a safelight is required for filtering out, screening and preventing transmission of certain light rays which would otherwise be damaging to photographic materials and particularly photographic paper. Illustrations of such safelight are shown in the following U.S. Patents:
  Moore, U.S. Pat. No. 2,297,974, Oct. 10, 1942
  Golden, U.S. Pat. No. 2,545,274, Mar. 13, 1951
  Dolan, U.S. Pat. No. 3,405,262, Oct. 8, 1968

Heretofore, in the use of safelights for darkrooms the light provided was normally sufficient to see what you are doing, but is not sufficient for reading, but is a light which is operatively red, amber or orange for illustration.

The use of a conventional television set within a darkroom would be practically impossible because the light rays eminating from the TV screen are sufficient to damage photographic materials and particularly photographic paper.

Applicant does not believe that heretofore TV sets can or have been used in darkrooms or to function as a safelight and at the same time provide entertainment during the tedious long periods of waiting when working in a darkroom.

THE PRIOR ART

The following patents illustrate filter screens heretofore applied to TV sets and to cathode tubes, but wherein there is no suggestion of using such filter assembly upon a cathode ray tube within a darkroom to function as a safelight.
  Richardson, U.S. Pat. No. 2,483,432, Oct. 4, 1949
  Kaplan et al, U.S. Pat. No. 2,492,224, Dec. 27, 1949
  Kirsch et al, U.S. Pat. No. 4,247,871, Jan. 27, 1981
  Kamerling, U.S. Pat. No. 4,427,264, Jan. 24, 1984

SUMMARY OF THE INVENTION

An important feature of the present invention is to provide a darkroom safelight filter assembly adapted for removable mounting upon a TV set to protectively exclude damaging light waves from photographic materials and particularly photographic paper.

Another feature is to permit the use of a TV set within a darkroom to provide entertainment to the worker during long and tedious process steps where without the present invention, such use of a TV set would be prohibited.

The present darkroom safe light filter assembly provides greater illumination within a darkroom than provided by standard safelights and with complete safety to photographic paper. The present darkroom safelight filter assembly for a TV set improves contrast of the picture. The tone of the picture is altered by the amber tint of the filter screen making it easier upon the eyes of the user. The light intensity can be simply adjusted by merely using the brightness control on the TV set. This is especially useful when using very sensitive BMW emulsions that are not the general run of photographic papers commonly used.

An important feature is to provide a darkroom safelight filter assembly which includes a substantially rectangular filter screen of an acrylic plastic material which is tinted in orange or amber or similar coloring such as will protectively exclude damaging light waves from photographic paper.

A further feature includes the adjustable mounting of a bracket upon the filter screen as a means of adjustably mounting the filter screen over the front face of a TV set and for adapting the filter screen to the location of the TV screen.

A further feature includes the use of a continuous strip of resilient sealing material in the nature of sponge rubber of open rectangular shape adhered to the inner surface of the filter screen and adapted to sealingly engage the front face of the TV set protectively enclosing the TV screen for the exclusion of damaging light waves from the TV screen onto any photographic paper within the darkroom.

Another feature of the present invention is to provide a darkroom safelight filter assembly which includes a filter screen with a peripheral protective bead thereon, a bracket adjustably mounted upon the filter screen and an internal peripheral seal of porous sponge rubber. This assembly is adapted to be removably mounted upon the front face of a TV set and to sealingly engage said front face surrounding the TV tube screen.

These and other features and objects will be seen from the following Specification and claims in conjunction with the appended drawing.

THE DRAWING

FIG. 1 is a front elevational view of a TV set with a darkroom safelight filter assembly mounted thereon.

FIG. 2 is a fragmentary right side elevational view thereof.

FIG. 3 is a similar view on an increased scale.

FIG. 4 is a side elevational view of a modified mounting for a darkroom safelight filter assembly upon a TV set.

FIG. 5 is a fragmentary perpsective view of the bracket assembly for the filter screen, on an increased scale of the type shown in FIGS. 4, 6, and 7.

FIG. 6 is a fragmentary side view of a modification.

FIG. 7 is a plan view of a modified darkroom safelight filter assembly applied to a TV set with a tension means for conforming the screen to the front face thereof.

FIG. 8 is an exploded view in perspective showing the present darkrooom safelight filter assembly and an illustrative TV set to which the filter assembly is removably mounted.

It will be understood that the above drawing illustrates merely a preferred embodiments of the invention and that other embodiments are contemplated within the scope of the claims hereafter set forth.

DETAILED DESCRIPTION OF AN EMBODIMENT OF THE INVENTION

Referring to the drawing, the conventional TV set designated TV mounted upon a suitable support 11 within a darkroom, FIG. 1, includes a casing having front face or front wall 13, sometimes referred to as an escutcheon, and top wall 14. The present darkroom safelight filter assembly 16 FIGS. 1 and 8, for the picture tube 15 of a conventional television set sometimes referred to as "CRT" or a television screen.

The present darkroom safelight filter assembly includes substantially the rectangular filter screen 17, preferably constructed of an acrylic plastic material, having some flexability and tinted orange or amber or similar coloring to have the capability of screening out from the picture tube or screen 15 those light rays which would be damaging to photographic materials and particularly photographic paper within a darkroom when the TV screen is activated. The tinting material normally in the conventional light spectrum has a wave length approximately equal to sodium vapor as conventionally known for safelights in darkrooms.

The present darkroom filter assembly 16 includes an elongated horizontal bracket or channel 19 which is vertically adjustable upon the screen and suitably secured thereto. In the illustrative embodiment, said bracket is in the form of a channel, FIGS. 1, 2 and 3 and preferably constructed of aluminum, for illustration.

On the forward side of said channel there are a pair of laterally spaced parallel elongated slots 21 adapted to receive fasteners 23 connected to an upper portion of filter screen 17. The use of elongated slots 21 in connection with the mounting for the filter provides a means by which there may be vertical adjustments of the filter so as to properly overlie the front face of the TV screen 15 or picture tube and for sealing thereover.

An elongated block or strip 25 of resilient material, preferably sponge rubber, is nested and retained within channel 19 and depends therefrom for supporting engagement with top wall 14 of the TV casing, FIGS. 2 and 3. In the illustrative embodiment, there is applied to the undersurface of resilient block 25 a layer 27 of a suitable cement or adhesive adapted for engaging retaining registry with top wall 14 of the casing of the TV set fragmentarily shown. A continuous strip of resilient light sealing material 29, preferably spong rubber and generally of rectangular shape is adhered to the rear surface of filter screen 17 utilizing a suitable adhesive or cement 27.

The continuous strip of resilient light sealing material is preferably square or rectangular in cross-section and is mounted upon the rear surface of the filter screen so as to register with front wall 13 of the television set casing so as to protectively enclose and surround the picture tube or screen 15, FIG. 1.

Under some circumstances the continuous sealing strip 29 is adapted to operatively bear against peripheral portions of tube 15. It is preferred that the continuous light sealing strip of resilient material acting as a spacer seal bears against the front face 13 of the TV set and is in snug registry therewith surrounding tube face 15. This provides a means of protectively excluding damaging light rays from photographic materials including photographic paper within the darkroom.

MODIFICATION

FIGS. 4, 5 and 6 show a modified darkroom filter screen assembly for a TV tube wherein instead of a bracket of channel form at 19, FIGS. 1, 2 and 3, there is employed an angle bracket 31 adjustably mounted upon the rear surface of filter screen 17.

The construction in FIG. 4 is similar to what is described with respect to FIGS. 1, 2 and 3, except that the angle bracket 31 has in its upright portion the pair of parallel laterally spaced slots 21, FIG. 5, with fasteners 23 and suitable steel washers 37. The filter screen 17 may be adjusted vertically with respect to a fixed location for angle bracket 31. There is a corresponding flexible and resilient rubber block or strip 25 which underlies angle bracket 31 and is suitably secured thereto as by cement or adhesive at 33.

The horizontal portion of angle bracket 31 and depending resilient block 25 rests upon the top wall 14 of the TV. The filter screen depends from angle bracket 31 and in the adjusted position shown is closely adjacent and arranged outwardly of picture tube 15 or CRT. Here the corresponding continuous light sealing strip 29 of a resilient material, such as sponge rubber, is similarly adhered to the rear surface of the filter screen at 27. Said strip operatively and sealingly engages the face or front wall 13 of the casing or housing of the TV, FIG. 4, and thus excludes harmful light rays from damaging photographic materials and particularly photographic paper within a darkroom when the TV is energized.

In the illustration, FIGS. 4, 5 and 6 the weight of the filter assembly is sufficient to support the filter screen and its bracketing in the position shown as overlying and mounting upon top wall 14 and with the hollow rectangular continuous sealing strip 29 sealingly engaging the front wall 13 and surrounding picture tube 15. The weight of the assembly is sufficient to compress the foam rubber seal 29 against the flat front wall 13 of the TV set and to provide a sufficient and effective light seal.

In FIG. 6, the corresponding angle bracket 31 is inverted and adjustably mounted by fasteners 23 upon the filter screen 17, fragmentarily shown. This illustration shows that by inverting the angle bracket, there is provided an additional adjustment of the filter screen with respect to the front wall and picture tube of the TV set. For this purpose a second resilient block 25 is mounted on and adhered to angle bracket 31.

MODIFICATION

FIG. 7 is a plan view of a modified darkroom safelight filter assembly and mount and a construction similar to what has been described with respect to FIGS. 4 and 6, but wherein there is a rearwardly curved front face 13 upon the forward side of the TV. In this construction the filter screen 17 has mounted peripherally therearound a resilient bead 35 of channel shape, also shown in FIG. 4, to protect marginal portions of filter 17.

An elastic cord 39 includes at its opposite ends the hook eyes 41 which extend under adjacent portions of beading 35 intermediate the height of filter screen 17. The elastic cord 39 extends around the sides and rear of the TV casing placing the hook eyes in sufficient tension as to slightly bow screen 17 rearwardly. The continuous resilient seal 29 is in operative engagement with the curved surface 13 on the front portion of the TV casing to effect a light tight seal, FIG. 7.

FIG. 8 of the drawing is a perspective exploded view of the present darkroom safelight filter assembly and mount at 16 which as a unit includes the filter screen 17 and its peripheral bead 35, with angle bracket 31 and the depending support block 25 of sponge rubber and the internal hollow open rectangular resilient seal 29 mounted on the filter screen for cooperative engagement with the front wall 13 of the TV shown in perspective.

For such assembly, the resilient block 25 overlies the top wall 14 of the TV with the filter screen 17 closely adjacent the picture tube face or screen 15 and light sealed by engagement of the continuous resilient seal 29 with adjacent portions of the front face 13 of the TV.

The present specially formulated fluorescent light absorbing filter screen 17 is easy to assemble over the front face of a TV set when it is to be used as a safelight within a darkroom; and is similarly removable therefrom by lifting off. The darkroom safelight filter assembly when adapted to a TV set to overlie and seal the front face of the cathode tube or screen effectively blocks out or prevents the passage therethrough of those light rays in the spectrum such as would damage photographic paper or other supplies during the period that the TV set is energized within the darkroom. This provides not only sufficient and adequate safelight within the darkroom but permits entertainment of the worker during long tedious periods employed for printing and developing film.

The present invention therefore provides a basis upon which a TV lset may be used and enjoyed in a darkroom with the light rays screened out by the present safelight filter assembly as applied to the TV screen to have the entertainment factor without the light passing therethrough having any damaging effect upon photographic paper.

Since TV's come in various sizes and dimensions and picture framing, the present mounting and bracket assembly for the filter screen is adapted for such adjustment as to seal over the front wall of the TV set and to protectively surround and enclose the TV tube.

Having described our invention, reference should now be had to the following claims:

We claim:

1. A darkroom safelight filter assembly for a TV set having a casing with a front and top wall and a tube with a screen within said casing comprising:
   a substantially rectangular filter screen of acrylic plastic material having front and rear surfaces and tinted to protectively exclude damaging light rays from photographic materials in a dark room;
   an elongated horizontal bracket adjustably mounted upon the rear surface of said filter screen adjacent its top:
   an elongated block of resilient material extending along and connected to said bracket;
   said block of resilient material and bracket overlying and mounted upon said casing top wall, the filter screen depending from said bracket and spaced outwardly of said casing front wall and TV screen;
   and a continuous strip of resilient light sealing material of generally rectangular shape adhered to the rear surface of said filter screen and in snug sealing registry with the casing front face and surrounding said TV screen.

2. In the safelight filter assembly of claim 1, said block and strip of resilient material being of a sponge rubber, substantially square in cross-section.

3. In the safelight filter assembly of claim 1, a layer of adhesive material underlying said block in registry with said casing top wall.

4. In the safelight filter assembly of claim 1, the adhering of sealing strip to said filter screen including a layer of adhesive mounted upon and along one side of said sealing strip.

5. In the safelight filter assembly of claim 1, said bracket being in the form of a channel, with said block of resilient material nested and retained within said channel and depending therefrom.

6. In the safelight filter assembly of claim 1, the adjustable mounting of said bracket to said filter screen including a pair of elongated laterally spaced parallel slots in said bracket;
   and spaced fasteners extending through said filter screen adjustably extending through said slots and secured to said bracket;
   whereby said filter screen may be adjusted with respect to said bracket to accommodate varying dimensional areas in the front face of said TV casing.

7. In the safelight filter assembly of claim 1, said bracket being an angle bracket having an upright leg adjustably secured to said filter screen and a horizontal leg, with said block of resilient material underlying and secured along said horizontal leg.

8. In the safelight filter assembly of claim 7, the adjustable mounting of said bracket to said filter screen including a pair of elongated laterally spaced parallel slots in said upright leg;
   and spaced fasteners extending through said filter screen and adjustably through said slots and secured to said upright leg.

9. In the safelight filter assembly of claim 7, a second block of resilient material overlying and secured along said horizontal leg, whereby said angle bracket may be rotated at 180° to increase the adjustability of said filter screen relative to said bracket and the front face of said TV casing.

10. In the safelight filter assembly of claim 1, the front face of said casing being curved rearwardly;
    a channel trim edge secured to and peripherally surrounding said filter screen;
    and an elastic tension cord having hooks at its free ends, said cord extending around the sides and rear of said TV casing intermediate its top and bottom with said hooks extending into and interlocked with opposed edge portions of said trim edge for flexing side portions of said filter screen towards said front face compressing said filter screen seal to conform to said front face.

* * * * *